Nov. 20, 1962  G. W. EHRSAM, JR., ET AL  3,064,552
BLAST ACTUATED CLOSURES
Filed Jan. 8, 1960  2 Sheets-Sheet 1
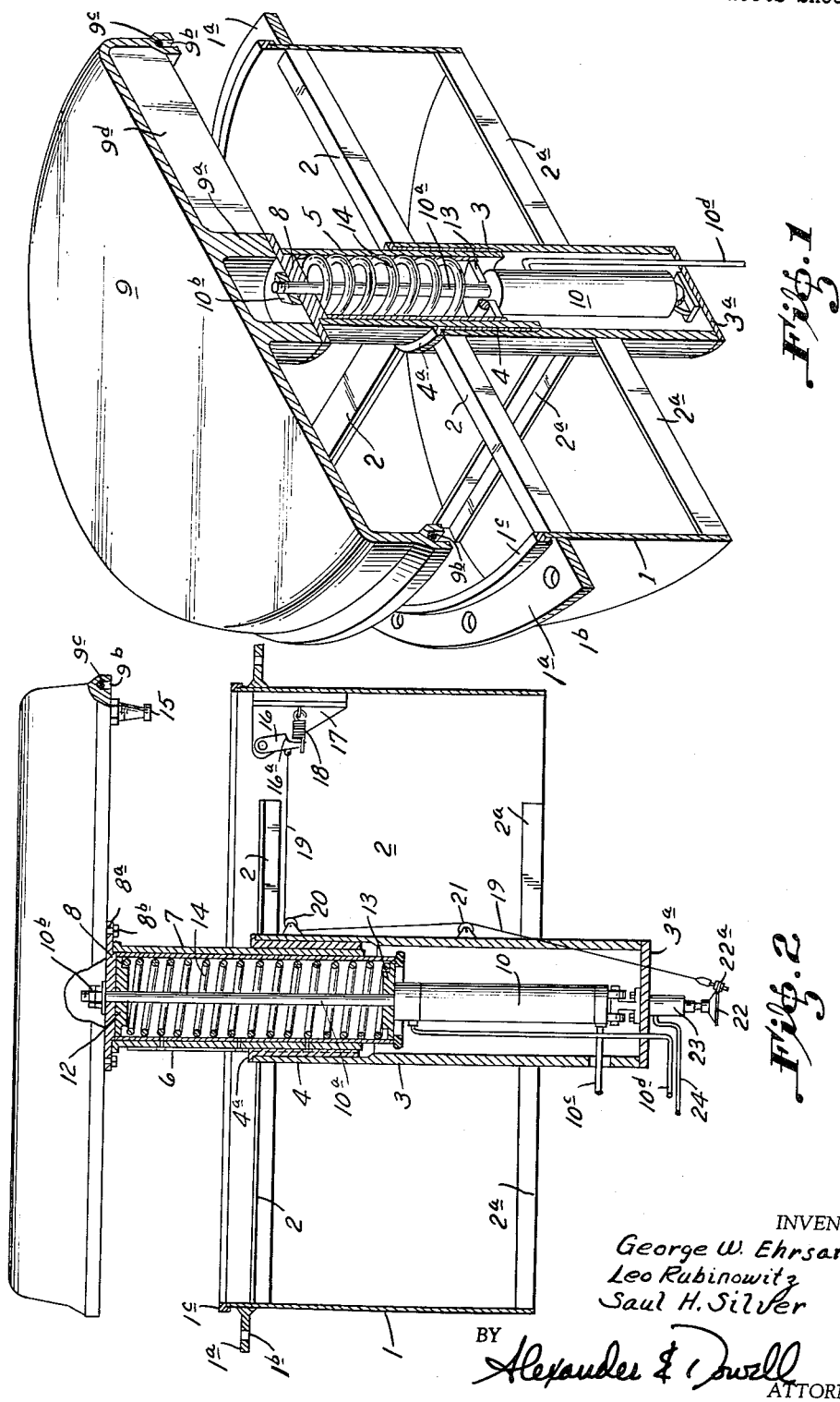
INVENTORS
George W. Ehrsam, Jr.
Leo Rubinowitz
Saul H. Silver
BY
Alexander & Dowell
ATTORNEY

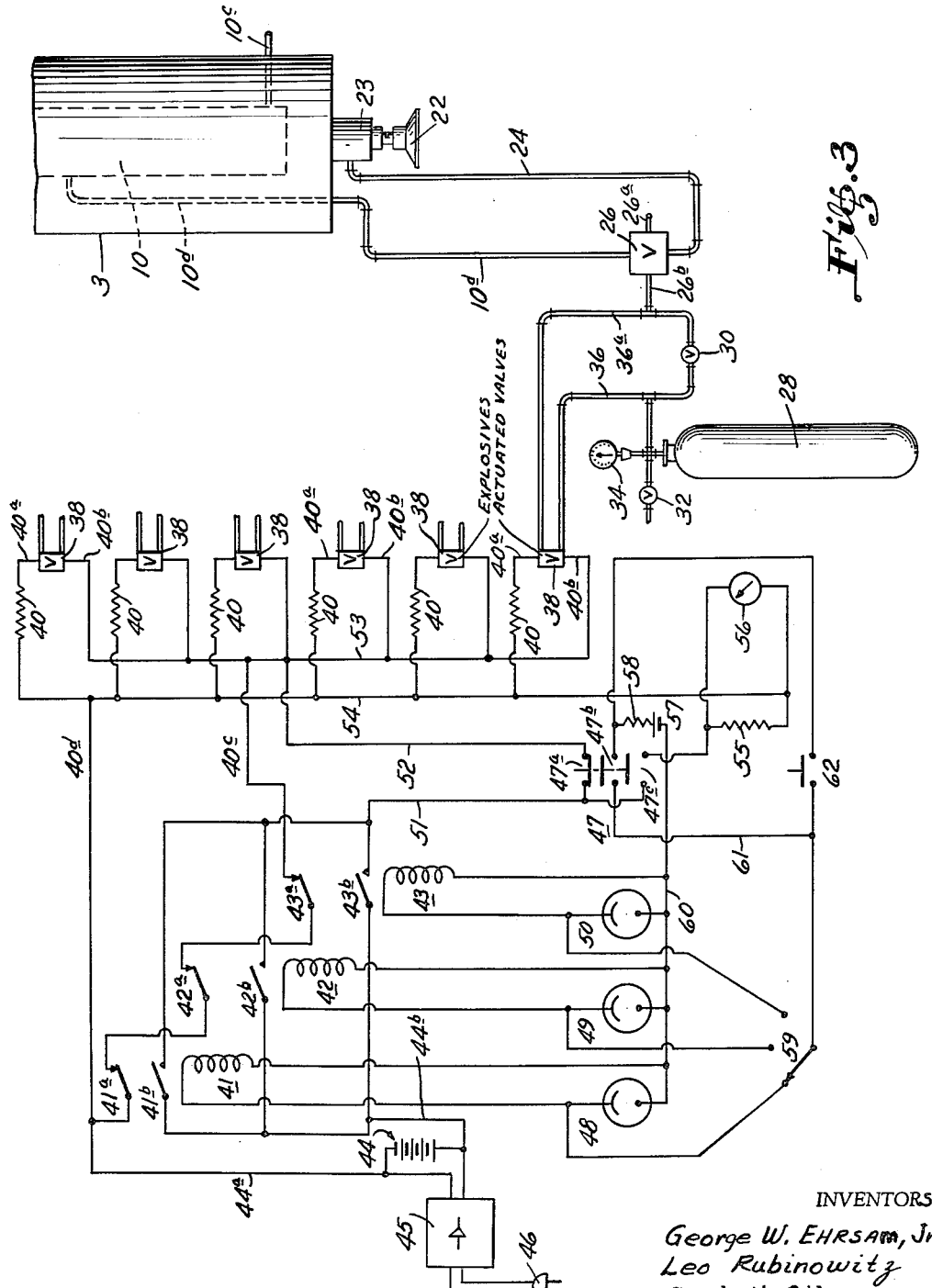

3,064,552
BLAST ACTUATED CLOSURES
George W. Ehrsam, Jr., Alexandria, Va., and Leo Rubinowitz and Saul H. Silver, Washington, D.C., assignors to American Machine & Foundry Company, a corporation of New Jersey
Filed Jan. 8, 1960, Ser. No. 1,231
6 Claims. (Cl. 98—119)

This invention relates to a duct closure and control means, and especially relates to ventilation duct closure systems for use in buildings and other shelters, which systems operate automatically to close the ducts in the event of an explosion in the vicinity of the building, and particularly in response to a nuclear blast such as might occur during an enemy attack.

It is a primary object of this invention to provide a blast closure device which when open allows a high volume of air circulation for purposes of ventilation, but which when closed is able to withstand very severe positive and negative pressure waves regardless of whether the ventilation duct which it controls is mounted with its axis extending vertically or horizontally, or inclined at an angle therebetween.

It is another principal object of the invention to provide a blast closure device which maintains a continuous watch to detect a blast of the type above mentioned to which it is sensitive, but which is non-responsive to spurious stimulae caused by normally-present energy radiating sources. The system employs a plurality of light-sensitive cells sufficient in number to provide a 360° coverage in azimuth. A system of this type, because of its sensitivity, requires some means to prevent triggering of the system by stray radiation attributable to other sources. Various means for preventing undesired operation of the system by normal light sources such as lightning, automobile headlights, sunlight, etc., have been proposed, which systems include, for example, optical filters protecting the sensitive cells from such other sources. A Wratten 89b photographic-type filter is conductive to pass a large percentage of light exceeding 700 millimicrons wave length, and absorbing energy of lesser wave length.

Another method of protecting against minimizing accidental firing is to utilize a circuit containing a capacitor which delivers a large charge of energy when one or more photo cells are excited by the intense thermal radiation emitted by a bomb explosion, but which capacitor does not discharge any such quantity of energy under steady-state conditions resulting from energy conversion of normal sunlight or light from artificial illumination sources.

Still another possible system is one in which the signal from the light-sensitive cell itself is used to deliver sufficient energy to operate explosive valves which then release mechanical actuating energy such as gas stored in a cylinder under pressure. The release of the pressurized gas can then be used to operate a closure means in one duct, or a plurality of such means all connected together to the same pneumatic system. The latter system is illustrated in the present drawings and described in more detail later in this specification.

It is another object of this invention to provide a blast closure system of the above mentioned type wherein a plurality of closures can be connected in parallel in the same pneumatic circuit for simultaneous operation, and especially to provide additional manual controls by which the closures may be closed and/or opened without necessity of firing the explosive squibs in the valves, it being desirable to be able to operate the closures time after time in order to test the operativeness thereof, as well as to close the ducts as may be necessary due to weather conditions.

Yet another object of the invention is to provide a blast closure system of the valve type wherein a metal bonnet comprises the closure, which bonnet is pulled downwardly over the duct opening and is latched tightly in place by striker pins which are attached to the bonnet and which engage spring latches within the duct to lock the bonnet in closed position until the latches are subsequently released. A pneumatic actuating cylinder is employed to pull the closure bonnet into closed position against the action of a spring-biasing means which continually urges the bonnet into open position, wherein the bonnet is extended outwardly beyond the end of the ventilation duct.

It is a further object of this invention to provide auxiliary pneumatic means connected to release all of the spring latches simultaneously when a control valve is actuated, which control valve exhausts the compressed gas from the main actuator cylinder and applies gas pressure to the auxiliary release cylinder. The latch means employed in connection with the bonnet insures that the bonnet will be continuously maintained in closed position even though failure of the pneumatic system may occur over a protracted period of time, or may occur as a result of the nuclear blast.

It is still another object of this invention to provide a ventilator duct closure means which can be manually closed in the event of failure of the automatic system. The closures actually built according to the present disclosure are about four feet in diameter and can be closed by two men applying the weight of their bodies on the top of the bonnet so as to drive it into closed and latched position.

Still a further important object of this invention is to provide a blast closure which in the latched position has a low silhouette so as to reduce the amount of side loading of the closure which results from pressure waves from the blast.

Other objects and advantages of the present invention will become apparent during the following discussion of the drawings, wherein:

FIG. 1 is a perspective view, partly in section, showing the principal mechanical parts of a blast closure according to the present invention.

FIG. 2 is a detailed cross-sectional view taken in a plane passing through the axis of the blast closure of the type shown in FIG. 1.

FIG. 3 is a schematic view of a preferred embodiment of the electronic blast detecting system and including a simplified pneumatic circuit, only one pneumatic circuit being illustrated in connection with the electronic circuit, although provision is indicated for five other pneumatic circuits.

Referring now to FIGS. 1 and 2, the closure device comprises a mounting duct 1 having a bolting flange 1a located near its upper end for the purpose of securing the duct 1 to a wall or roof (not shown) through which the duct extends. The bolting flange 1a has a series of bolt holes 1b located around its periphery. At the uppermost end 1b of the mounting duct 1 is a seat 1c which comprises an annular ring welded onto the upper end of the duct.

Within the duct is a network of struts including upper struts 2 and lower struts 2a, these struts extending inwardly and supporting a vertical slide tube 3. This slide tube 3 has a sleeve bearing 4 secured in its upper end, the entrance of the sleeve bearing into the slide tube being limited by a flange 4a at the upper end of the bearing.

A hollow shaft 5 slides into the sleeve bearing 4, the sleeve bearing being preferably made of bronze, and the hollow shaft 5 being chromium plated on its exterior surface.

The hollow shaft 5 has a key 6 extending from its outer surface and sliding in a keyway of corresponding shape within the bronze bearing 4, this means preventing rotation of the hollow shaft 5 with respect to the bearing 4 and with respect to the mounting duct 1.

The chromium plated shaft 5 is connected with an inner sleeve 7 which terminates at its upper end in a transverse plate 8 having a mounting flange 8a which is secured by means of bolts 8b to the hub 9a of a main closure bonnet 9.

Within the slide tube 3 and the sleeve 7 is an actuating system which includes a main pneumatic cylinder 10 including a piston (not shown) which is connected with a rod 10a extending upwardly through the sleeve 7 and terminating in a threaded upper end. Lock nuts 10b and a washer are employed at the upper end of the piston rod 10a so as to secure the latter to the plate 8. Several bearing plates 12 and 13 are provided within the sleeve 7 and support the two ends of a heavy compression spring 14 which spring continuously biases the piston rod 10a toward its extended position and raises the bonnet 9 away from the upper end of the mounting duct 1. Pneumatic pipes 10c and 10d connect the respective lower and upper ends of the cylinder 10 with a pneumatic circuit, which will be described below. The lower end of the cylinder 10 is mounted on a transverse plate 3a fixed to the lower end of the tube 3 in any satisfactory manner which will maintain the lower end of the pneumatic cylinder 10 in fixed relation with respect to the plate 3a.

The bonnet 9 comprises the main closure which covers the open end of the duct 1. As stated above, a seat 1c is fixed around the upper end of the duct 1, and the bonnet 9 has an annular groove 9b around its lower end, this groove having an O-ring 9c in its inner surface, the O-ring being compressed against the seat 1c when the bonnet is pulled closed and the seat extends upwardly into the groove 9b. The bonnet 9 also includes a plurality of reinforcement ribs such as the rib 9d which extends radially as shown in FIG. 1. It is to be understood that other well-known types of reinforcements of the bonnet may be employed, for instance circumferential ribs in addition to radial ribs.

The outside contour of this bonnet was carefully selected after studying various other possible shapes. The bonnet should, of course, be convex so as to permit it to be reinforced on its inside surfaces. On the other hand, a hemispherical shape has inherent difficulties because of the fact that its height above the end of the duct would permit a considerable unnecessary side loading by a pressure wave. In addition, the hemispherical shape necessarily includes a much greater overhang beyond the actual supporting bearing 4, and this overhang is so great that it could not be tolerated in installations where the axis of the duct lies in a horizontal plane.

The torispherical shape shown in FIGS. 1 and 2 was finally decided upon since it minimizes both of the above mentioned difficulties, and an aluminum casting was finally decided upon for the purpose of reducing weight. In the working models presently employed, the cast aluminum head is 49⅛" in diameter and 7" high with an 11" diameter hub in the center of the casting. The total weight of the head is about 265 lbs. which is less than half of the weight of a similar head fabricated of steel.

The head has a plurality of striker pins 15 extending downwardly therefrom, as shown in FIG. 2, and these pins engage and are latched by the shoulder 16a of springloaded pawls 16 mounted on brackets 17 fixed to the inner periphery of the main duct 1.

A tension spring 18 biases each latch pawl toward the wall of the main duct and a release cable 19 is also attached to each pawl 16, each cable being passed over pulleys 20 and 21 and being connected with a flange 22a mounted on a plunger 22 which is operated by an auxiliary release cylinder 23 which is in turn connected with the pneumatic system by means of tubing 24 in a manner to be described hereinafter. It will be noted that when the auxiliary cylinder 23 is pressurized, the plunger 22 is driven downwardly so as to pull the release cable 19 and move each of the pawls connected to the plunger 22 inwardly toward the center of the main duct 1 whereby the striker pins 15 are disengaged from the pawls so that the main spring return 14 can raise the bonnet upwardly to the open position shown in FIGS. 1 and 2.

Referring now to the diagram of FIG. 3, in the upper right-hand corner is illustrated the lower portion of the main tube 3 which supports the main actuating cylinder 10, two pipes 10c and 10d being shown extending outwardly of the cylinder 10. The pipe 10d is connected with the main pressure source for closing the bonnet, the pipe 10c being an exhaust duct.

The pipes 10d and 24 are connected with the four-way valve 26. This valve has a vent pipe 26a at one end and an inlet pipe 26b at the other end through which gas pressure from the cylinder 28 may be applied. Ordinarily, the four-way valve leaves the pipe 10d connected with the pipe 26b, and at the same time leaves the pipe 24 connected with the vent pipe 26a and therefore open to atmospheric pressure. However, in the other position of the valve 26, the pipe 10d is connected with the vent 26a so as to open the upper end of the cylinder 10 to atmospheric pressure, and the pipe 24 is then connected directly to the pressure side of the system represented by the pipe 26b. A hand valve 30 is connected in the system so that pressure from the gas bottle 28 can be directly connected with the valve 26 by manual operation so as to open or close the bonnet 9. The gas pressure bottle may also include an auxiliary valve 32 through which the system may be recharged, and preferably also includes a gas pressure gauge 34 to permit visual determination of the condition of charge of the gas bottle 28.

The automatic control of the system is accomplished through the pipes 36 and 36a, these pipes going to valve 38 which normally blocks the passage of gas therethrough, this valve 38 being an explosive actuated valve which has two wires 40a and 40b connected therewith, whereby when these wires are connected to a source of electricity, the explosive squib within the valve 38 is fired and the valve is thereby opened to permit gas from the pressure bottle 28 to flow through the pipes 36, 36a and 26b into the four-way valve 26 which determines whether the bonnet is opened or closed. It will be noted that the circuit including the explosive valve 38 and the wires 40a and 40b which connect therewith is duplicated in five more similar circuits in this drawing, which duplication indicates that a plurality of blast closure systems can be operated in parallel. Similar parts in the other systems have been similarly labeled.

All of the wires 40b are connected mutually in parallel to a wire 40c and all of the wires 40a are connected through resistances 40 to a common wires 40d. When electrical power is applied to the wires 40c—40d, the squibs in all of the valves 38 are fired. When wires 40c and 40d are connected with the upper terminals of three relays 41, 42 and 43, the terminals being labeled 41a, 42a and 43a. In the inactive state of this system, the wires 40c and 40d are short-circuited together through the normally closed relay terminals 41a, 42a and 43a for the purpose of preventing the presence of stray electrical fields from firing the squibs in the explosive valves 38.

A battery 44 is provided in the system, and this battery is maintained continuously charged by a trickle charge 45 having an electrical plug 46 for supplying power from the other power lines. Although this trickle charger normally keeps the battery 44 charged, if the main power lines are disrupted, the battery would then have sufficient charge to actuate the circuit at any time within a period of months after disruption of the electric current. Note that one side of the battery 44 is connected by wire 44a to the wire 40d. It is therefore only necessary that a circuit be completed to the wire 40c from the other terminal of the battery in order to fire the squib in the valve 38.

The connection to the other side of the battery 44 for the purpose of firing squibs in the valves 38 is made through the wire 44b which connects with the normally-open relay terminals 41b, 42b and 43b. The other sides of these terminals are connected together and are connected through the normally-closed switch terminals 47a of the three-pole push button switch 47. The terminals 47a are normally closed, and therefore if any one of the relays 41, 42 or 43 is closed by light energizing one of the photoelectric members 48, 49 or 50, the battery is connected by the associated relay directly to the explosive squibs in the valves 38 through the wires 51 and 52, which in turn connect with a common wire 53 connected with all of the explosive squibs.

In addition, test means is provided for determining the operativeness of the system, said tests either including destructive exploding of the squibs in the valves 38, or alternatively the non-destructive testing of a portion of the system. Non-destructive testing is selected by depressing the push-button switch 47 so as to open the terminals 47a and to close the normally-open terminals 47b and 47c. The latter switch terminals connect the wire 51 to a resistance 55 connected in parallel with a test meter 56. In other words the power supplied through the wire 51 from the battery 44 is rerouted from the squibs to the parallel circuit of the simulated load resistance 55 and the meter 56 through the terminals 47c. In addition, a battery 57 and a current limiting resister 58 are connected via the terminals 47b when the switch 47 is depressed through a selector switch 59 to whichever one of the relays 41, 42 or 43 is selected by the switch 59.

In FIG. 3, the switch 59 is connected to select the relay 41, and it will be noted that a circuit can be traced from the battery 57 through the wire 60 to relay 41, switch 59, the wire 61, the terminals 47b, and the current limiting resistor 58. The closing of this circuit opens the short-circuiting relay terminal 41a and closes the associated terminals 41b so as to supply current from the battery 44 through the switch terminals 47c to the simulated load resistance 55 and the meter 56. In a similar manner, the circuits through the other relays 42 and 43 can be traced by moving the switch 59 to the appropriate test position, and each of these tests is a non-destructive test since the power from the battery is rounted into the simulated load resistance 55 instead of into the explosive squibs of the valves 38.

On the other hand, if it is desired to test the entire blast closure system, such a test can be conducted by pressing the normally-open switch 62. This switch completes a circuit from the test battery 57 through the current limiting resistor 58, through the switch 62 and through the switch 59 and whichever one of the relays the switch 59 is adjusted to select, in the illustrated case, the relay 41.

The other end of the winding of the relay 41 connects with the wire 60 which returns the winding to the test battery 57. Since during this destructive test the switch terminals 47a are closed, when one of the relays is operated, for instance relay 41, current is supplied from the battery 44 through the terminals 41b and from the wire 51 and the terminals 47a and the wire 52 to the explosive valves, the squibs in these valves all being connected through the resistances 40 to the wires 54 which is in turn connected to the other side of the main battery 44. When the squibs are fired, a circuit is completed from the gas bottle 28 through the pipes 36 and 36a and into the valve 26 which then connects the pipe 26b to the pipe 10d to actuate the associated pneumatic cylinder 10 to pull the bonnet 9 into sealing position on the seat 1c.

We do not limit our invention to the exact form shown in the drawings for changes may obviously be made therein within the scope of the following claims.

We claim:

1. A duct closure device comprising support means in the end of the duct including a slide tube axially disposed and fixed to the duct and a hollow shaft telescopically engaging the slide tube and axially reciprocable with respect to the duct; a duct closure head disposed transversely at the end of the duct and shaped to mate therewith, the head being fixed to and supported by said shaft; closure actuator means inside the telescopically engaging support means and coupled to pull the shaft inwardly of the duct and mate the head with the end of the duct; and control means for operating said closure actuator means.

2. In a device as set forth in claim 1, said head comprising a torispherical closure member having a flattened convex surface facing away from the end of the duct and having a central hub on its concave surface and attached to said hollow shaft, the periphery of said head having a continuous groove shaped to receive the end of the duct.

3. In a device as set forth in claim 1, spring means within said telescoping support means and normally urging said shaft outwardly of the duct; automatic latch means connected with the duct and the head to maintain the head mated with the duct against the force of said spring means; and latch release means connected with and actuated by said control means.

4. A duct closure device comprising support means in the end of the duct including a member fixed to the duct and a movable member, the latter being axially reciprocable with respect to the duct; a duct closure head disposed transversely at the end of the duct and shaped to mate therewith, the head being fixed to and supported by said movable member; closure actuator means in the duct and connected with the movable support member for mating the head with the end of the duct; and control means for operating said closure actuator means, said fixed support means comprising a slide tube fixed to the duct along the central axis thereof, and said movable member comprising a shaft telescopically supported in said tube and connected at its outer end with the closure head; said closure actuator means comprising fluid operated piston and cylinder means fixed within the tube and connected with said shaft; and said control means comprising a source of fluid pressure connected with said cylinder means, and valve means in control of the flow of fluid.

5. In a device as set forth in claim 4, spring means within said tube and urging the shaft in direction outwardly thereof; automatic mechanical latch means connected to the duct and to the head for latching the latter in closed relation on the former; and auxiliary piston and cylinder latch-release means connected with said control means.

6. In a device as set forth in claim 5, selector valve means connected between the fluid pressure source and the two cylinder means for alternatively pressurizing the first cylinder means to close the device or the latch-release means to open the device.

References Cited in the file of this patent

UNITED STATES PATENTS

| | | |
|---|---|---|
| 863,059 | Elmer | Aug. 13, 1907 |
| 978,175 | Lindemeyer | May 9, 1911 |
| 2,450,021 | Schirmer | Sept. 28, 1948 |
| 2,738,448 | Bokser | Mar. 13, 1956 |
| 2,799,781 | Joyce et al. | July 16, 1957 |

FOREIGN PATENTS

| | | |
|---|---|---|
| 105,175 | Great Britain | Apr. 5, 1917 |
| 476,537 | Great Britain | Dec. 10, 1937 |

OTHER REFERENCES

Publication by Conax Corp. (a paper presented at the American Rocket Society, September 24, 1956), page 3 only.